(12) United States Patent
Alves

(10) Patent No.: US 6,747,687 B1
(45) Date of Patent: Jun. 8, 2004

(54) SYSTEM FOR RECOGNIZING THE SAME VEHICLE AT DIFFERENT TIMES AND PLACES

(75) Inventor: James Francis Alves, San Diego, CA (US)

(73) Assignee: Pulnix America, Inc., Sunnyvale, CA (US)

( * ) Notice: Subject to any disclaimer, the term of this patent is extended or adjusted under 35 U.S.C. 154(b) by 0 days.

(21) Appl. No.: 09/481,131

(22) Filed: Jan. 11, 2000

(51) Int. Cl.[7] ............................................... H04N 7/18
(52) U.S. Cl. .................... 348/148; 348/143; 348/161; 340/932.2; 340/933; 340/988; 340/989; 340/990; 382/104; 382/105
(58) Field of Search .................... 348/148, 25, 156, 348/159, 143, 161; 340/932.2, 933, 937, 988, 984–990, 993, 995, 425; 382/104, 105

(56) References Cited

U.S. PATENT DOCUMENTS

| 4,603,390 A | * | 7/1986 | Mehdipour et al. | 705/418 |
| 4,671,650 A | * | 6/1987 | Hirzel et al. | 356/28 |
| 4,774,571 A | * | 9/1988 | Mehdipour et al. | 348/148 |
| 5,687,249 A | * | 11/1997 | Kato | 382/104 |
| 5,845,227 A | * | 12/1998 | Peterson | 340/905 |

* cited by examiner

Primary Examiner—Shawn S. An
(74) Attorney, Agent, or Firm—Thomas E. Schatzel; Law Offices of Thomas E. Schatzel

(57) ABSTRACT

In a vehicle time-of-entry and time-of-exit system, the passing of a vehicle through an entrance generates a "trigger-t0" signal. An entrance video camera provides realtime images of entering vehicles. The trigger-t0 signal causes one video frame of the image of vehicle to be stored or "frame-grabbed" in an entrance subsystem. A time-of-entry clock-time signal is used to time-stamp the image which is then forwarded on a connection to a matcher. The passing of a vehicle through an exit generates a "trigger-t1" signal. An exit video camera 116 provides realtime images of exiting vehicles. The trigger-t1 signal causes one video frame of the image of vehicle to be stored or "frame-grabbed" in an exit subsystem. A clock-time signal is used to time-stamp the image which is then forwarded on a connection to the matcher. A output automatically provides a length-of-stay for each exiting vehicle according to its time-of-entry. The matcher uses the unique characteristics in the images of the vehicles to declare a match. While a license plate number is unique, reading any or all of a license plate is not necessary for the extraction of visual signatures related to particular cars. For example, in the limited variety of cars that would patronize a particular parking lot, the color, trim, style, tires, wheelcovers, collision damage, etc., of each vehicle can be used in combination to distinguish individual ones.

2 Claims, 2 Drawing Sheets

SYSTEM FOR RECOGNIZING THE SAME VEHICLE AT DIFFERENT TIMES AND PLACES

FIELD OF THE INVENTION

Figure 1:
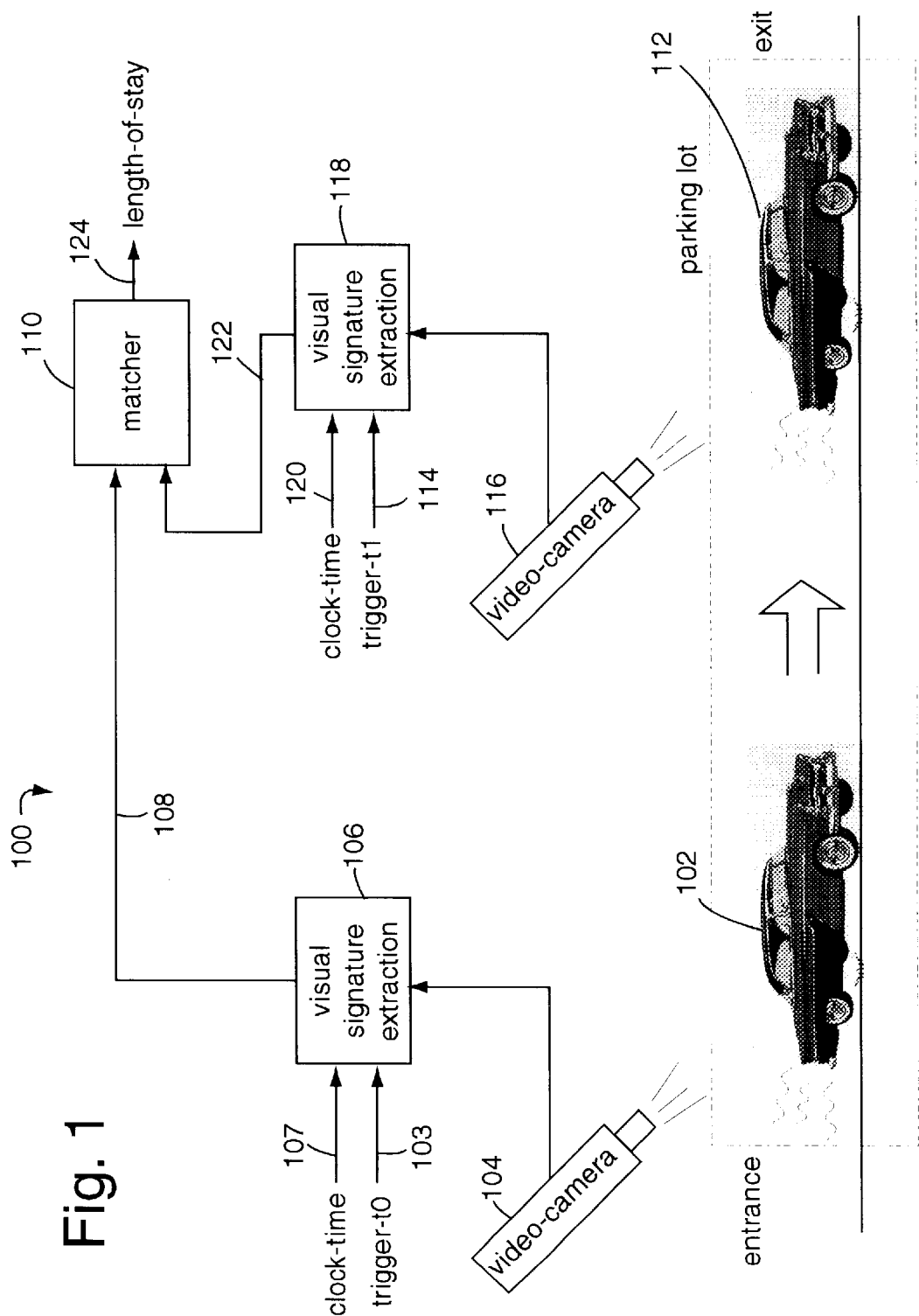

The present invention relates to computer recognition systems, and more particularly to systems that record the passing of a vehicle at one camera location and then recognize the same vehicle passing a second camera at another location.

DESCRIPTION OF THE PRIOR ART

There are many reasons that a robot that could recognize individual vehicles could be useful. Traffic ticketing systems that photograph speeders and red-light-runners and mail the drivers notices of violation are well known. Such systems generally require a high quality photograph that clearly shows the car and its license plate are needed for convictions. Pulnix America, Inc., (Sunnyvale, Calif.) markets several cameras for such systems that can image high quality photographs even under adverse conditions. The Netherlands Government recently tried a freeway speed-enforcement system that used a "matcher" technology. A three kilometer stretch of the A2-freeway between Rotterdam and Amsterdam was outfitted with two sets of three cameras, one camera for each lane. A "visual signature" of the vehicle and time-of-passing information was sent to a database from the first set of cameras as each car entered the measured three kilometer trap. As each car passed the second set of cameras at the end of the trap, its visual signature and time-of-passing information was matched with that in the database to compute speed. If a violation was detected, the license-plate identity was processed from the visual signature and tickets were issued to the speeders. The "privacy" of non-violators was respected by their license plate information never being extracted into human-readable form if the tests indicated they had not been speeding.

Similar matcher technology was used in the first attendentless video tolling system on the Canadian 407-Highway. Ontario license plates of non-transponder equipped vehicles are automatically read by computer from camera images collected at all 128 entry and exit ramps. The non-Ontario vehicles, or ones with non-readable plates, caused the matcher technology to pair entry and exit vehicles images to assist later inspection by a human.

As can be expected, such recognition systems are not able to extract complete license plate information in every case. But there are many useful applications where only the vehicle needs to be recognized, and the license plate information is of no consequence. This is similar to recognizing a person's face, but not being able to remember their name.

SUMMARY OF THE INVENTION

It is therefore an object of the present invention to provide a recognition system within the video cameras that recognizes the coming and going of particular vehicles.

It is a further object of the present invention to provide a recognition system within the video cameras that automatically computes the residence times of particular vehicles in certain areas.

Briefly, in a vehicle time-of-entry and time-of-exit system embodiment of the present invention, the passing of a vehicle through an entrance generates a "trigger-t0" signal. An entrance video camera provides realtime images of entering vehicles. The trigger-t0 signal causes one video frame of the image of vehicle to be stored or "frame-grabbed" in an entrance subsystem. A time-of-entry clock-time signal is used to time-stamp the image which is then forwarded on a connection to a matcher. The passing of a vehicle through an exit generates a "trigger-t1" signal. An exit video camera provides realtime images of exiting vehicles. The trigger-t1 signal causes one video frame of the image of vehicle to be stored or "frame-grabbed" in an exit subsystem. A clock-time signal is used to time-stamp the image which is then forwarded on a connection to the matcher. An output automatically provides a length-of-stay for each exiting vehicle according to its time-of-entry. The matcher uses the unique characteristics in the images of the vehicles to declare a match. While a license plate number is unique, reading any or all of a license plate is not necessary for the extraction of visual signatures related to particular cars. For example, in the limited variety of cars that would patronize a particular parking lot, the color, trim, style, tires, wheelcovers, collision damage, etc., of each vehicle can be used in combination to distinguish individual ones.

An advantage of the present invention is that a recognition system within the video cameras is provided that can be used in a ticketless parking system.

Another advantage of the present invention is that a recognition system within the video cameras is provided that does not require special equipment to be carried by any vehicles being monitored to quickly find pattern matches.

A further advantage of the present invention is that a recognition system within the video cameras is provided that does not require the licenses plates to be readable of any vehicles-being-monitored to compute length-of-stay in a parking lot.

These and other objects and advantages of the present invention will no doubt become obvious to those of ordinary skill in the art after having read the following detailed description of the preferred embodiments which are illustrated in the various drawing figures.

IN THE DRAWINGS

Figure 2:
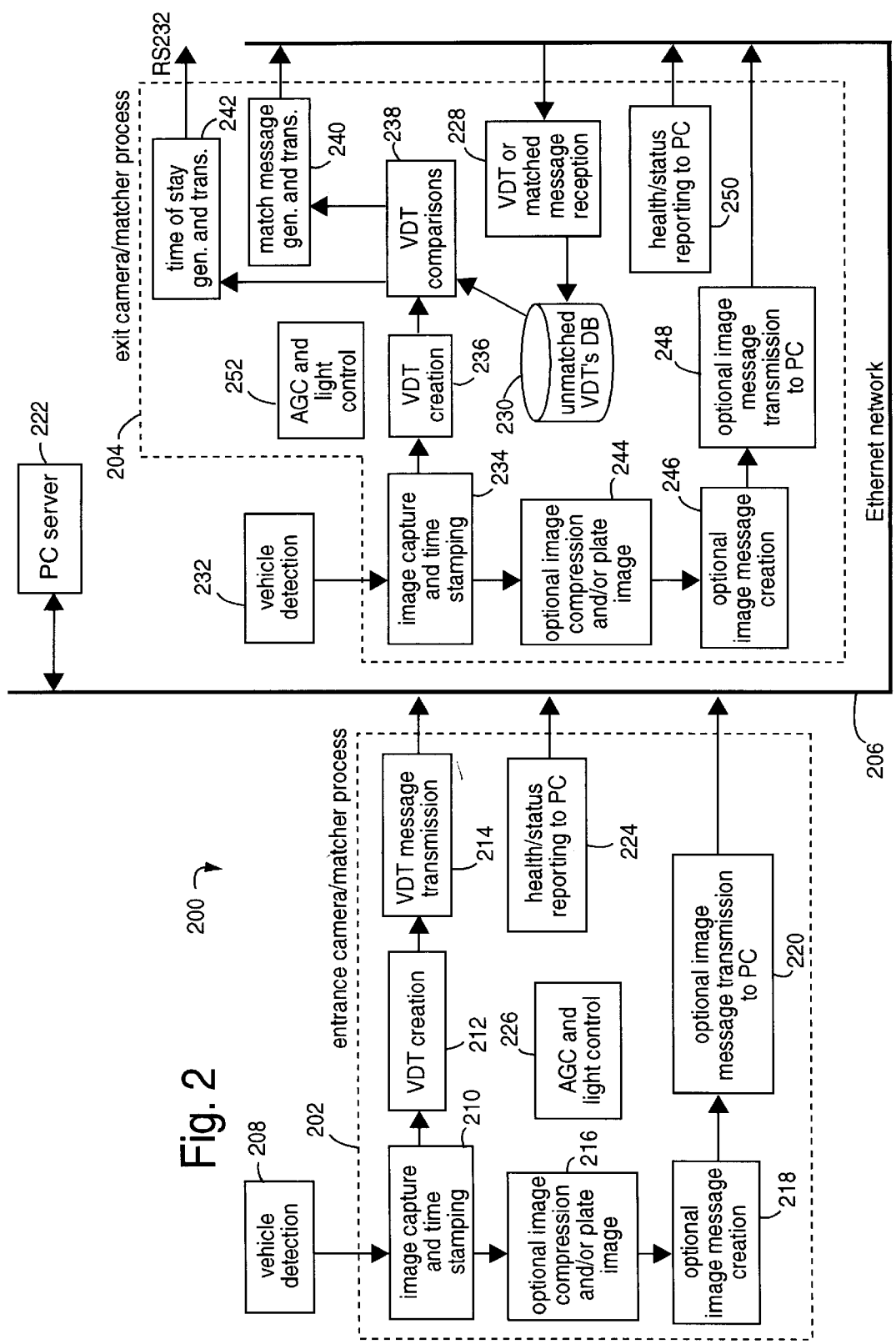

FIG. 1 is a functional block diagram of a vehicle time-of-entry and time-of-exit system embodiment of the present invention; and FIG. 2 is a flowchart and functional block diagram of a system embodiment of the present invention for recognizing the passing of the same vehicle at different times and places.

DETAILED DESCRIPTION OF THE PREFERRED EMBODIMENT

A vehicle time-of-entry and time-of-exit system embodiment of the present invention is illustrated in FIG. 1 and is referred to herein by the general reference numeral 100. The passing of a vehicle 102 through an entrance generates a "trigger-t0" signal 103. An entrance video camera 104 provides real-time images of entering vehicles. The trigger-t0 signal 103 causes one video frame of the image of vehicle 102 to be stored or "frame-grabbed" in an entrance subsystem 106. A time-of-entry clock-time signal 107 is used to time-stamp the image which is then forwarded on a connection 108 to a matcher 110. The passing of a vehicle 112 through an exit generates a "trigger-t1" signal 114. An exit video camera 116 provides real-time images of exiting vehicles. The trigger-t1 signal 114 causes one video frame of the image of vehicle 112 to be stored or "frame-grabbed" in an exit subsystem 118. A clock-time signal 120 is used to time-stamp the image which is then forwarded on a connection 122 to the matcher 110. An output 124 automatically provides a length-of-stay for each exiting vehicle according to its time-of-entry. The matcher 110 uses the unique characteristics in the images of the vehicles 102 and 112 to declare a match. While a license plate number is unique, reading any or all of a license plate is not necessary for the extraction of visual signatures related to particular cars. For example, in the limited variety of cars that would patronize a particular parking lot, the color, trim, style, tires, wheelcovers, collision damage, etc., of each vehicle can be used in combination to distinguish individual ones.

FIG. 2 shows a system for recognizing the same vehicle at different times and places. Such system is implemented as a method embodiment of the present invention, and is referred to herein by the general reference numeral 200. The method 200 includes an entrance camera/matcher process 202 and an exit camera/matcher process 204. Both such processes communicate over an ETHERNET local area network (LAN) 206. Activity begins when a vehicle detector 208 senses that a moving vehicle is passing through an entrance area monitored by the entrance camera/matcher process 202. A step 210 triggers a video camera to take a still picture of the rear end of the entering vehicle. The step 210 then time-stamps the image. A vehicle detection tag (VDT) is created from such time-stamped image in a step 212. The VDT is preferably a distilled set of data artifacts that represent a unique visual signature of the vehicle. All normal "picture" information that a human would recognize would ordinarily be discarded, e.g., to save on processing time and storage needs.

The VDT is embedded in a message datapacket by a step 214 and sent out on the LAN 206 to the exit camera/matcher process 204. Optionally, a step 216 compresses the image from step 210. A step 218 constructs an image message and a step 220 transmits such compressed-image message to a personal computer (PC) 222. For example, such PC 222 could be placed in front of a parking lot attendant or security officer. A background process 224 periodically reports the operational health and status of the entrance camera/matcher process 202 to the PC 222. Automatic gain control (AGC) and lighting control is managed by another background process 226.

The exit camera/matcher process 204 receives the VDT messages in a step 228. Such step 228 can also receive "matched-messages" that inform it to remove stored records of unmatched VDT's. A database 230 of unmatched VDT's represents all the vehicles that have entered the system but not yet left it. Activity begins when a vehicle detector 232 senses that a moving vehicle is passing through an exit area monitored by the exit camera/matcher process 204. A step 234 triggers a video camera to take a still picture of the rear end of the exiting vehicle. The step 234 also time-stamps the image. A vehicle detection tag (VDT) is created from such time-stamped image in a step 236.

A step 238 compares the VDT's from step 236 to those stored in the unmatched VDT database 230. Commercial video recognition technology available from Pulnix America, Inc. (Sunnyvale, Calif.), Silicon Recognition (Sunnyvale, Calif.), and IBM Component Development (91105 Corbeil-Essonnes, France). In particular, the IBM neural network marketed as the ZISC-036 is preferred.

A step 240 generates "match-messages" that detail which VDT's and vehicles have been recognized. A step 242 calculates the time of stay, e.g., in a parking lot, and transmits the result out over an "RS-232" serial communication port.

Optionally, a step 244 compresses the image from step 234. A step 246 constructs an image message and a step 248 transmits such compressed-image message to the PC 222. A background process 250 periodically reports the operational health and status of the exit camera/matcher process 204 to the PC 222. Automatic gain control (AGC) and lighting control is managed by another background process 252.

The systems 100 and 200 of FIGS. 1 and 2 can be used to construct a "ticketless" parking system, for example. Ticketless parking is similar in concept to the airline industry's approach to electronic ticketing, in which tickets are electronically time-stamped and then tracked by computers automatically. Instead of issuing a physical ticket to the patrons as they enter a parking lot, ticketless parking uses information within the image of the entering vehicle to automatically and uniquely characterize that particular vehicle. Computers then automatically track the vehicle and determine its time of stay, thereby eliminating the need for a patron or an attendant to become directly involved in the process. Since the system issues no ticket to the patron, there is no need for an entrance gate, thereby significantly increasing the flow rate of the traffic entering the lot. This can prevent traffic backups on the approach to the lot entrance. Furthermore, the ticketless parking system interfaces with the existing parking system to provide essential information to aid in determining payment, as well as number cars in and out, average parking time, and prepaid parking or monthly parking registration.

A typical ticketless parking system comprises a network of one or more entry matcher subsystems, e.g., process 202 (FIG. 2). As a vehicle enters the parking lot, an entry matcher automatically creates and time-stamps a vehicle detection tag, which contains visual cues that are unique for each vehicle. The entry matcher then sends the vehicle detection tag to the exit matchers via the network, e.g., process 204. It is possible to have many entrances and exits. Just prior to exiting the lot, an exit matcher subsystem creates a temporary vehicle detection tag of the exiting vehicle, and uses it to find a match against the list of entry vehicle detection tags. A match allows the time-stamp information to be read and the system automatically determines the vehicle's time-of-stay.

As vehicles pass the entry camera, it takes a single "still" image of the back of each passing vehicle. For each vehicle image, the entry matcher subsystem recognizes visual cues, unique for that vehicle, and reduces it into a vehicle detection tag. Since a license plate is a very unique feature of any vehicle, the system's design maximizes the use of the license plate in creating the vehicle detection tag, though the presence of a license plate is not essential to creating a unique vehicle detection tag. The matcher never explicitly "reads" the license plate. It incorporates the visual characteristics of the plate, as well as other parts of the vehicle into each vehicle detection tag. After creating each vehicle detection tag, the entry matcher sends it in real-time to the exit matcher, located downstream of the traffic. As vehicles pass the exit camera, it takes "still" images of each passing vehicle, and generates unique vehicle detection tags from these images in a manner similar to the entry system. As the exit matcher generates each "exit" vehicle detection tag, it also compares it in real-time to the existing list of entry vehicle detection tags, which were collected at the entry system. The end result is that the technique "pairs" an exit vehicle detection tag with an entry vehicle detection tag, thus it recognizes, or matches, a vehicle across the two sites. Both vehicle detection tag generation and comparison require the use of special hardware to achieve real-time system throughput.

A license plate frame or trailer hitch often prevents an automatic license plate reader from working, even to the extent that a human may have trouble reading the same plate. In such cases, the "obstruction" often enhances the performance of the matcher, because the obstruction tends to form a highly unique and recognizable signature for the vehicle when incorporated as part of the vehicle detection tag. Matching is, in general, a simpler process than license plate reading, and intrinsically has a lower incidence of troublesome cases. When new styles of license plates appear, license plate readers require modification in order to maintain the same degree of accuracy for the new plates. Matching, however, is an adaptive process, which incorporates and uses the features of new plates to generate vehicle detection tags without having to make any changes to the software or the system. Matcher technology is also superior to the use of radio or infrared transponders in that it does not require that the patron to possess any special hardware in the car in order to be processed by the system.

A typical ticketless parking system is a network of one or more entry matcher subsystems, one or more exit matcher subsystems, and a server. The network is a customizable 100 base-T or 10 base-T ETHERNET, or FDDI interface. Both the entry and exit matcher subsystems consist of the same basic components, namely a vehicle imaging subsystem, and a vehicle pattern acquisition computer. The vehicle imaging subsystem uses Pulnix's unique dynamic range management technique and high resolution cameras to consistently generate high quality vehicle images under varying light conditions twenty-four hours a day. The vehicle pattern acquisition computer receives and processes the vehicle image into a highly compressed pattern of data that uniquely identifies the vehicle. The vehicle pattern acquisition is software configurable to perform tasks specific to either an entry or exit matcher subsystem.

The vehicle imaging subsystem is a low cost imaging solution for violation enforcement systems, automatic license plate and vehicle matching applications. The vehicle imaging subsystem function is to produce legible images of passing vehicles in all weather and lighting conditions. The vehicle imaging subsystem is capable of imaging retro-reflective and non-retro-reflective plates, including older plates with diminished retro-reflective properties during the day or at night. The vehicle imaging subsystem uses a smart light sensor to measure the instantaneous dynamic range of plate/vehicle brightness and electronically adapt camera parameters, such as gain and shutter speed, to achieve optimal imaging of the vehicle and license plate. This process requires no mechanically moving parts, such as an automatic iris lens, thereby minimizing the opportunity for component failures and enabling instantaneous adaptation to changing lighting conditions. The smart light sensor generates commands every 1/10 second and broadcasts commands to cameras on an RS-485 serial communication network. One light sensor can connect up to sixteen cameras for multi-lane applications.

The vehicle imaging subsystem camera utilizes a state-of-the-art progressive interline transfer charge-couple device (CCD) that images all of the vertical resolution at once, that is no field-to-field imaging delays. Progressive scanning allows the vehicle imaging subsystem camera to freeze a rapidly moving vehicle at high resolution without the need for a mechanical shutter. The vehicle imaging subsystem camera is capable of capturing a full-frame image on demand from an external vehicle detection trigger. The vehicle imaging subsystem camera provides a 768 pixels by 484 lines image, which is enough resolution for up to one full traffic lane width of coverage depending on the thickness of license plate characters.

As a vehicle enters the parking lot, a vehicle detection device, such as a smart loop and/or a light curtain, triggers the entry matcher subsystem to capture a picture of the vehicle. The vehicle imaging subsystem camera takes a picture of the vehicle, and the vehicle pattern acquisition computer rapidly generates a vehicle detection tag using special image processing hardware and software. The entry matcher time-stamps the vehicle detection tag and gives it a unique system identification number. Then, in real-time, the entry matcher compares the vehicle detection tag against a database of prepaid patrons' vehicle detection tags.

Depending on the size of the database, prioritizing the vehicle detection tag comparison by using other visual characteristics found in the vehicle image, such as plate polarity, position on vehicle, etc., can optimize performance. A match identifies this vehicle as well as its vehicle detection tag as being a prepaid patron and the entry matcher will broadcast the appropriately flagged vehicle detection tag on the network. The entry matcher can also filter the current prepaid patron's vehicle detection tag into its existing vehicle detection tag, to keep the stored vehicle detection tag up to date, and broadcast the new vehicle detection tag on the network to the other entry matchers as well as the server.

A non-match causes the entry matcher to broadcast a regular patron flagged vehicle detection tag on the network. In both cases the entry matcher extracts the license plate image from the vehicle image, sends it to the server for later usage. Optionally, the entry matcher can compress and send the vehicle image to the server.

The entry matcher is responsible for maintaining a prepaid patron database, and adds updated prepaid patron vehicle detection tags, add new prepaid patron vehicle detection tags and remove vehicle detection tags of patrons that no longer want to prepay. In addition, the entry matcher must report the health status of its vehicle imaging subsystem to the server. The entry matcher will maintain its internal clock by receiving time updates from the server or low cost global positioning system.

Just prior to exiting the lot, a vehicle detection device triggers the exit matcher subsystem to capture a picture of the vehicle. The vehicle imaging subsystem camera takes a picture of the vehicle, and the vehicle pattern acquisition computer rapidly generates a vehicle detection tag in the same manner as the entry matcher. The exit matcher time-stamps the vehicle detection tag and, in real-time, compares the vehicle detection tag to the residing patron database, supplied by the entry matchers. Prioritizing the vehicle detection tag comparison by using time of entry, as well as other visual characteristics found in the vehicle image, such as plate polarity, position on vehicle, etc., can optimize performance. A match, accesses time of entry information to determine the time of stay, which the exit matcher supplies to the pay station to collect the applicable fee. In cases of a no match, the exit matcher extracts the license plate image from the vehicle image, sends it along with the system identification numbers of the top three match candidates to the server. The server accesses the plate images of the potential patrons using the system identification numbers supplied by the exit matcher, and with the aid of a human attendant, will decide the correct match and respond back to the exit matcher. This answer allows the exit matcher to determine the time stay, which it supplies to the pay station. In either case, the exit matcher removes the matched vehicle detection tag from its database and broadcasts a message to remove the vehicle detection tag from the database of the other exit matchers as well as the server. Optionally, the exit matcher can compress and send the vehicle image to the server.

The exit matcher maintains a residing-patron database, and adds new patron vehicle detection tags as they are received from the entry matchers. It removes the vehicle detection tags of exiting patrons that were detected by other exit matchers. In addition, the exit matcher must report the health status of its vehicle imaging subsystem to the server.

The exit matcher will maintain its internal clock by receiving time updates from the server or low cost global positioning system.

The server subsystem interacts with the entry and exit matchers as well as a parking lot attendant. From the entry matcher, the server receives vehicle detection tags of new residing patrons, and updated vehicle detection tags of prepaid patrons. The server maintains the master prepaid patron vehicle detection tag database in case an entry matcher needs to reload its database. The server also receives a license plate image for each entering vehicle from the entry matcher, which it must add to the license plate image database. The server will present these images to the attendant to allow a patron to select his license plate when he registers as new prepaid patron, or wants to resign as a prepaid patron. The server needs to send the appropriate message to the entry matcher to add new prepaid patron vehicle detection tags or remove former prepaid patron vehicle detection tags.

From the exit matcher, the server receives messages that a residing patron is leaving and must remove him from the residing patron vehicle detection tag and license plate image database. The server maintains the master residing patron vehicle detection tag database in case an exit matcher needs to reload its database. If the server receives an ambiguous match along with a license plate image from an exit matcher, it will present this image along with the candidate matching plate images it retrieves from the residing patron plate image database to the attendant to aid in selecting the correct match.

Optionally, the server can store and process the compressed vehicle image in the same fashion as the license plate image. In addition, the server processes the health status of the vehicle imaging subsystem used by the entry and exit matchers. Optionally, the server can maintain the ticketless parking system's internal clock by receiving time updates from low cost global positioning system and in turn updating the clocks of the entry and exit matchers.

Following is a functional description of software residing in the entry matcher, exit matcher and server subsystems. The entry-matcher subsystem uses vehicle detection triggers to command a camera to capture a vehicle image. It generates and time-stamps a vehicle detection tag for each vehicle entering the parking lot. It assigns each vehicle detection tag a unique system identification number. It searches a prepaid patron database to put a prepaid or regular flag in the vehicle detection tag. It broadcasts residing patron vehicle detection tags to the exit matcher and server. If it is a prepaid patron, it filters the vehicle detection tag and sends a new vehicle detection tag to other entry matchers and servers. It extracts license plate images from the vehicle image, and sends it to the server. It adds new prepaid patron vehicle detection tags from the server. It optionally, compresses and sends the vehicle image to the server. It monitors and sends the vehicle imaging subsystem health status to the server. It updates its internal clock.

The exit-matcher subsystem software uses a vehicle detection trigger to command a camera to capture the vehicle image. It generates and time-stamps a vehicle detection tag for each vehicle about to exit the parking lot. It searchs the residing patron database, to find a matching vehicle detection tag. If a match is found, it computes time of stay and sends information to the pay station. If no match is found, it extracts a license plate image from the vehicle image, sends it and the system identification number of possible patrons to the server, gets match results from the server, computes the time of stay and sends the information to the pay station. It removes matching residing patron vehicle detection tags determined locally or from other exit matchers. It adds new residing patron vehicle detection tags from the entry matchers. It optionally, compresses and sends vehicle images to the server. It monitors and sends vehicle imaging subsystem health status to the server. It updates its internal clock.

The PC server subsystem collects inputs from entry matchers and maintains the residing patron vehicle detection tag and license plate image databases. It collects inputs from entry matchers and maintains the prepaid patron vehicle detection tag database. It interfaces with an attendant to register a new prepaid patron or remove an existing prepaid patron. It collects input from exit matchers and maintains the residing patron vehicle detection tag and license plate image databases. It interfaces with an attendant to resolve ambiguous matches reported by an exit matcher. It processes vehicle imaging subsystem health status. It updates its internal clock.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A system for recognizing a vehicle at different times and places comprising:

an entrance video camera for providing a first video image of an entering vehicle, said entrance video camera being automatically triggered by said entering vehicle without requiring any other action by said entering vehicle or its driver to have access to a designated area;

an exit video camera for providing a second video image of an exiting vehicle, said exit video camera being automatically triggered by said exiting vehicle without requiring any other action by said exiting vehicle without requiring any other action by said exiting vehicle or its driver to exit said area;

a memory device for electronically storing said first and second video images;

a first time-stamp associated with the entrance video camera for applying a time to said first video image representing the time when said entering vehicle entered said area;

a second time-stamp associated with the exit video camera for applying a time to said second video image representing the time when said entering vehicle exited said area;

a matcher connected to the memory device and for identifying when said entering vehicle in said first video image is the same vehicle as said exiting vehicle in said second video image, the matcher providing for a match of said vehicle in said first and second video images based on match information that includes at least one of vehicle color, trim, style, tires, wheel covers, collision damage or a combination thereof to distinguish individual vehicles and without requiring a complete reading of a license plate number;

a length-of-stay computer connected to the memory device and having access to the first and second time-stamps, and calculating the time duration said vehicle visited said area when the matcher provides said match information;

a vehicle detection tag (VDT) created from a time-stamped said first video image and comprising a distilled set of data artifacts representing a unique visual signature of said entering vehicle and discarding visual information not unique to said vehicle to limit required processing time and storage needs, the VDT being embedded in a message data packet transmitted to the matcher; and a background processor for periodically reporting the operational health and status of the entrance and exit video cameras.

2. The system of claim 1, further comprising:

a database of unmatched VDT's for representing vehicles that have entered but not exited said area.

* * * * *